(12) United States Patent
Tsuchida et al.

(10) Patent No.: US 7,825,849 B2
(45) Date of Patent: Nov. 2, 2010

(54) OBJECT DETECTING APPARATUS AND METHOD FOR DETECTING AN OBJECT

(75) Inventors: Jun Tsuchida, Susono (JP); Setsuo Tokoro, Nishikamo-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 111 days.

(21) Appl. No.: 12/224,326

(22) PCT Filed: Feb. 23, 2007

(86) PCT No.: PCT/IB2007/000436

§ 371 (c)(1),
(2), (4) Date: Sep. 25, 2008

(87) PCT Pub. No.: WO2007/096755

PCT Pub. Date: Aug. 30, 2007

(65) Prior Publication Data

US 2009/0135065 A1 May 28, 2009

(30) Foreign Application Priority Data

Feb. 24, 2006 (JP) ............................ 2006-049169

(51) Int. Cl.
*G01S 13/86* (2006.01)
*G01S 13/93* (2006.01)
(52) U.S. Cl. .......................................... 342/70; 342/52
(58) Field of Classification Search .................. 342/70, 342/52
See application file for complete search history.

(56) References Cited

U.S. PATENT DOCUMENTS

| | | | | |
|---|---|---|---|---|
| 6,492,935 B1 * | 12/2002 | Higuchi | | 342/70 |
| 6,580,385 B1 * | 6/2003 | Winner et al. | | 342/70 |
| 6,583,752 B2 * | 6/2003 | Samukawa et al. | | 342/70 |
| 6,862,537 B2 * | 3/2005 | Skrbina et al. | | 702/32 |
| 6,903,677 B2 * | 6/2005 | Takashima et al. | | 342/70 |
| 7,026,976 B1 * | 4/2006 | Higashida | | 342/70 |

(Continued)

FOREIGN PATENT DOCUMENTS

JP    A-2001-134769    5/2001

(Continued)

OTHER PUBLICATIONS

Tsuchida et al.; "Development of the PCS Obstacle Recognition System Fuses the Stereo Vision System and the Millimeter Wave Radar;" Feb. 15, 2007. (with Abstract).

(Continued)

*Primary Examiner*—Thomas H Tarcza
*Assistant Examiner*—Matthew M Barker
(74) *Attorney, Agent, or Firm*—Oliff & Berridge, PLC

(57) ABSTRACT

An object detection apparatus includes a radar that detects the position of an object; an imaging device that detects the position and size of an object; a fusion processing device that fuses the object detected by the radar device and the object detected by the imaging device as the same object, when the detection results of the radar device and the imaging device satisfy a prescribed fusion condition, to generate a fusion object having position information and size information. A provisional fusion object is generated if the detection result from the imaging device does not satisfy the fusion condition with respect to the detection result from the radar.

8 Claims, 8 Drawing Sheets

U.S. PATENT DOCUMENTS

| | | | |
|---|---|---|---|
| 7,030,775 B2 * | 4/2006 | Sekiguchi | 340/903 |
| 7,042,389 B2 * | 5/2006 | Shirai | 342/70 |
| 7,176,830 B2 * | 2/2007 | Horibe | 342/70 |
| 7,321,669 B2 * | 1/2008 | Southall et al. | 382/106 |
| 7,358,889 B2 * | 4/2008 | Abe et al. | 342/70 |
| 7,417,580 B2 * | 8/2008 | Abe et al. | 342/27 |
| 7,432,848 B2 * | 10/2008 | Munakata | 342/52 |
| 7,460,951 B2 * | 12/2008 | Altan et al. | 701/207 |
| 7,570,198 B2 * | 8/2009 | Tokoro | 342/70 |
| 2005/0021201 A1 | 1/2005 | Klotz et al. | |
| 2006/0091653 A1 * | 5/2006 | De Mersseman et al. | 280/735 |
| 2006/0091654 A1 * | 5/2006 | De Mersseman et al. | 280/735 |
| 2006/0140449 A1 * | 6/2006 | Otsuka et al. | 382/104 |
| 2007/0036434 A1 * | 2/2007 | Saveliev | 382/173 |

FOREIGN PATENT DOCUMENTS

| | | |
|---|---|---|
| JP | A-2004-117071 | 4/2004 |
| JP | A-2004-347471 | 12/2004 |
| JP | A-2005-141517 | 6/2005 |
| JP | A-2005-158012 | 6/2005 |
| JP | A-2005-326296 | 11/2005 |
| JP | A-2006-292621 | 10/2006 |

OTHER PUBLICATIONS

Office Action issued Oct. 20, 2009 in Japanese Patent Application No. 2006-049169 (with translation).

* cited by examiner

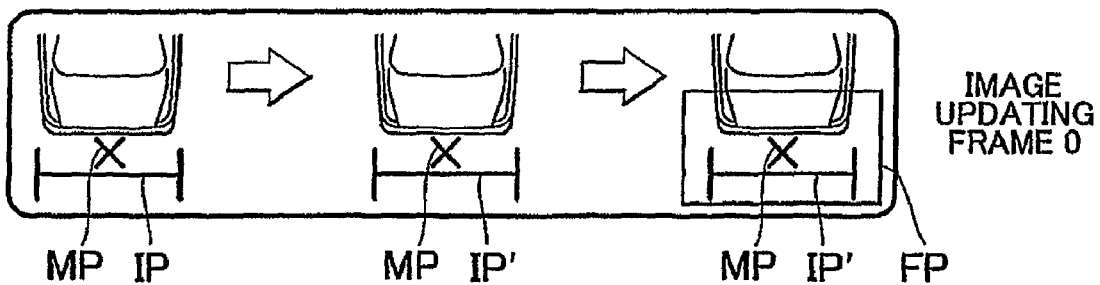
FIG. 7A — IMAGE UPDATING FRAME 0
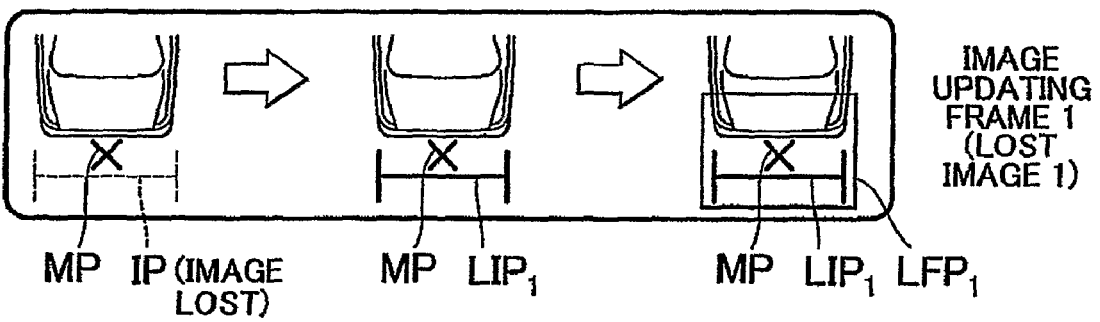
FIG. 7B — IMAGE UPDATING FRAME 1 (LOST IMAGE 1)
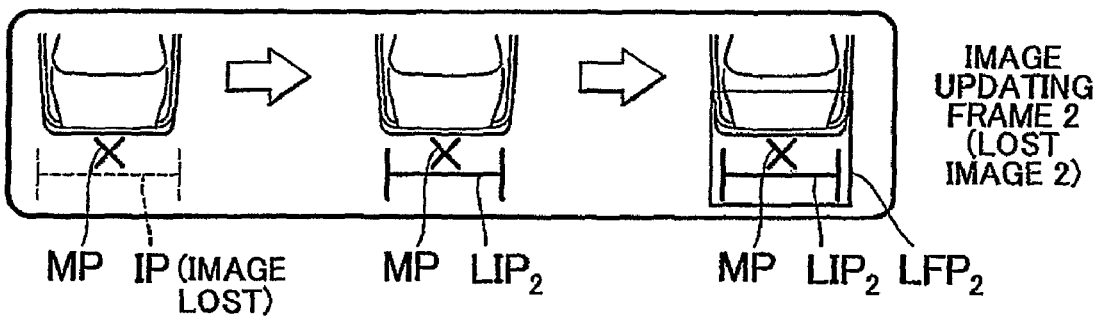
FIG. 7C — IMAGE UPDATING FRAME 2 (LOST IMAGE 2)
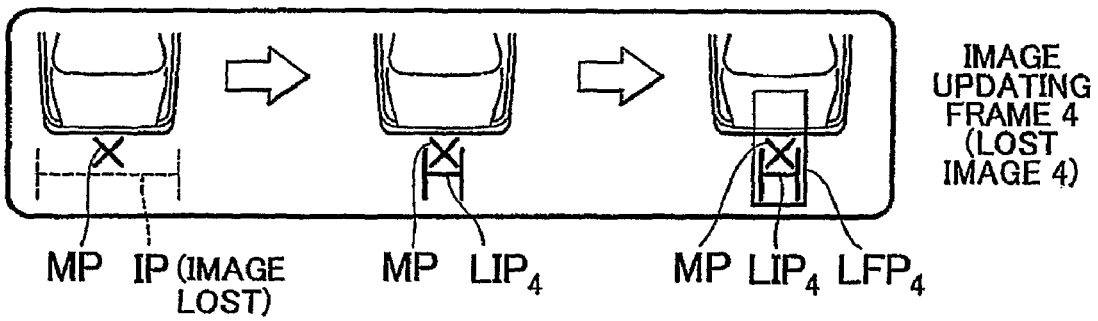
FIG. 7D — IMAGE UPDATING FRAME 4 (LOST IMAGE 4)

OBJECT DETECTING APPARATUS AND METHOD FOR DETECTING AN OBJECT

BACKGROUND OF THE INVENTION

1. Field of the Invention

The present invention relates to an object detecting apparatus and method for detecting an object that combines the detection results of a radar means and an imaging means to detect an object.

2. Description of the Related Art

Driving support apparatuses such as collision-reduction apparatuses, adaptive cruise control apparatuses, and car-following apparatuses have been developed in recent years. In these driving support apparatuses, detection of a vehicle moving in front of the host vehicle is important. To improve detection accuracy, some object detection apparatuses have a radar means such as a millimeter wave radar and an imaging means such as a stereo camera. In an object detection apparatus having a radar means and an imaging means, the position (distance) of an object is detected by the radar means, and the size of the object is detected by the imaging means (refer to, for example, Japanese Patent Application Publication No. JP-A-2001-134769). In an object detection apparatus having a radar means and an imaging means, a radar-detected object detected based on radar information is compared with an imaging-detected object detected based on image information and a determination is made as to whether the radar-detected object and the imaging-detected object are the same. If it is determined that the objects are the same object, the object is set as a detected object (fusion object) such as a vehicle in front of the host vehicle (refer, for example, to Japanese Patent Application Publication No. JP-A-2004-117071).

When a new fusion object is set, a coincidence comparison is performed with the fusion object registered the previous time and, if there is coincidence, the fusion object information is updated. If, however, there is no coincidence, the new fusion object is newly registered, and the past fusion object that did not coincide is immediately deleted.

However, if the image obtained by the imaging means, such as a stereo camera or the like, is unstable, even if an object exists (and is detected by the radar), because of the influence by the condition of light reception (for example, at sunset or because of shadows), the imaging-detected object is often momentarily lost (undetected). Conventionally, when such momentary image loss occurs, the past object that did not coincide is immediately deleted and there is a repetition of the sequence of updating, deletion, updating, and so on of the fusion object, such that it is not possible to properly update the size of the object. Thus, there is a possibility that reliability of the information calculated using the history information (continuous detection rate) of the fusion object differs from the actual situation. Improper updating of the fusion object may also occur, for example when there is a momentary overlap between a leading vehicle and a white line on the road, or when there is a momentary overlap between two or more leading vehicles, so that the width of the imaging-detected object is erroneously detected as showing an extreme widening.

SUMMARY OF THE INVENTION

The present invention provides an object detection apparatus and a method for detecting an object that appropriately updates the fusion object even if it is not possible to properly acquire the size information of a fusion object because of momentarily unstable results from the imaging means.

An object detection apparatus according to a first aspect of the present invention has a radar means that detects the position of an object; an imaging means that detects the position and size of an object; a fusion processing means that fuses the object detected by the radar means and the object detected by the imaging means when the detection results of the radar means and the imaging means satisfy a prescribed fusion condition, to generate a fusion object having position information and size information. The fusion processing means has an updating means that generates a provisional fusion object, by interpolation based on size information of a previously acquired fusion object, if the detection result from the imaging means does not satisfy the fusion condition with respect to the detection result from the radar means, and updates the previously acquired fusion object to the provisional fusion.

According to the object detection apparatus of the first aspect of the present invention, if it is possible for the radar means to detect the generated fusion object, even if it is not possible to properly acquire size information because of momentarily unstable detection results from the imaging means due to non-detection or misdetection of the image, it is presumed that there is an error in the detection results from the imaging means and that the previously object detected still exists. Furthermore, considering that the reliability of the size information decreases, by generating a provisional fusion object having the size information acquired by an interpolation based on size information of the previously acquired fusion object, the effect is achieved of enabling the updating of the fusion object with a minimum of influence from the failure to properly acquire the size information.

In the object detection apparatus of the first aspect of the present invention, the updating means may, with the passage of time when the detection result from the imaging means does not satisfy the fusion condition with respect to the detection result from the radar means, change the size information of the provisional fusion object so as to depart from a value that is close to the size information of the previously acquired fusion object.

According to the object detection apparatus of the first aspect of the present invention, because, with the passage of time when the detection result from the imaging means does not satisfy the fusion condition with respect to the detection result from the radar means, the size information of the provisional fusion object obtained by interpolation is changed so as to depart from a value that is close to the size information of the previously acquired fusion object, the effect is achieved of being able to reduce the degree of influence on the reduction of reliability of the size information with the elapse of time.

In the object detection apparatus of the first aspect of the present invention, the updating means non-linearly increases the amount of change of the size information of the provisional fusion object with the elapse of time.

According to the object detection apparatus of the first aspect of the present invention, because the amount of change of the size information of the provisional fusion object is non-linearly increased, a return to the original fusion object is facilitated when the imaging means again provides a normal detection result occurs after a momentarily unstable detection result by the imaging means in accordance with a prediction in the interpolation. In addition, it is possible to reduce the influence of erroneous information on the post-stage logic when, contrary to the prediction in the interpolation, there is an error in the detection result from the radar means and the detection result from the imaging means is proper.

BRIEF DESCRIPTIONS OF THE DRAWINGS

The foregoing and further objects, features and advantages of the invention will become apparent from the following descriptions of example embodiments with reference to the accompanying drawings, wherein like numerals are used to represent like elements and wherein.

Figure 3A:
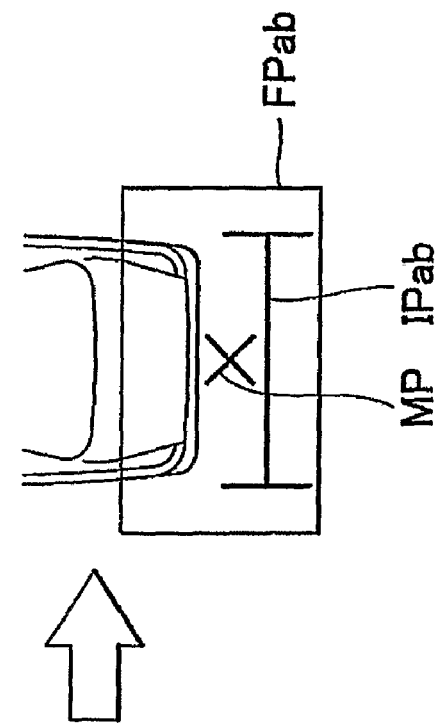
Figure 3B:
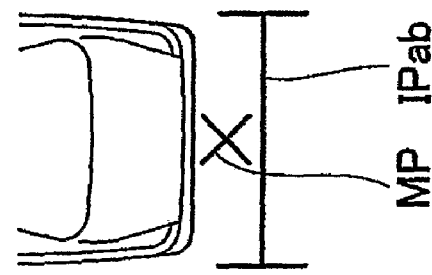
Figure 3C:
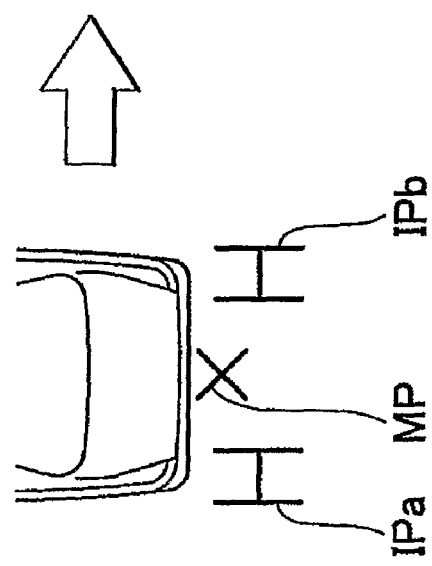
Figure 4:
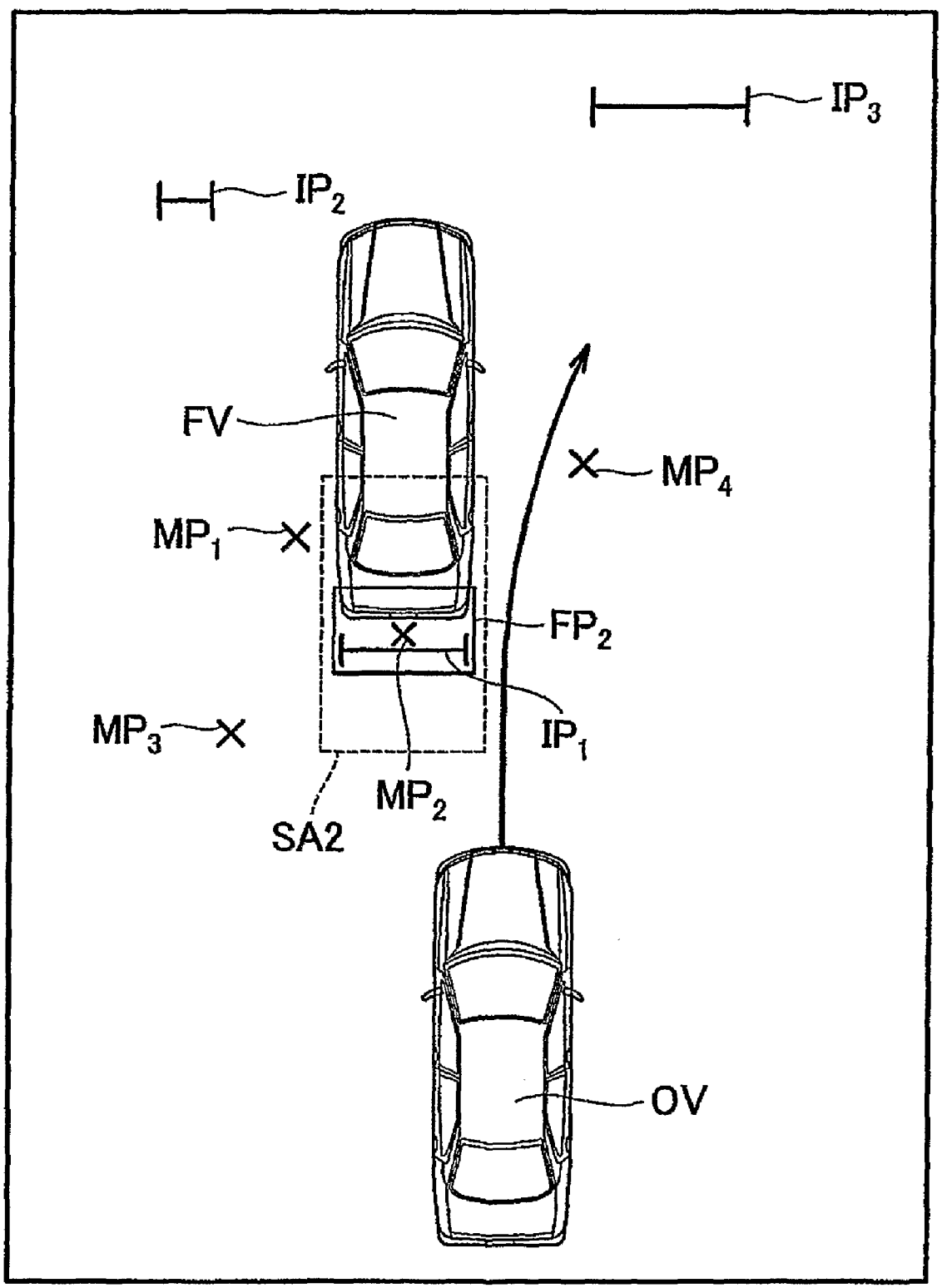
Figure 5:
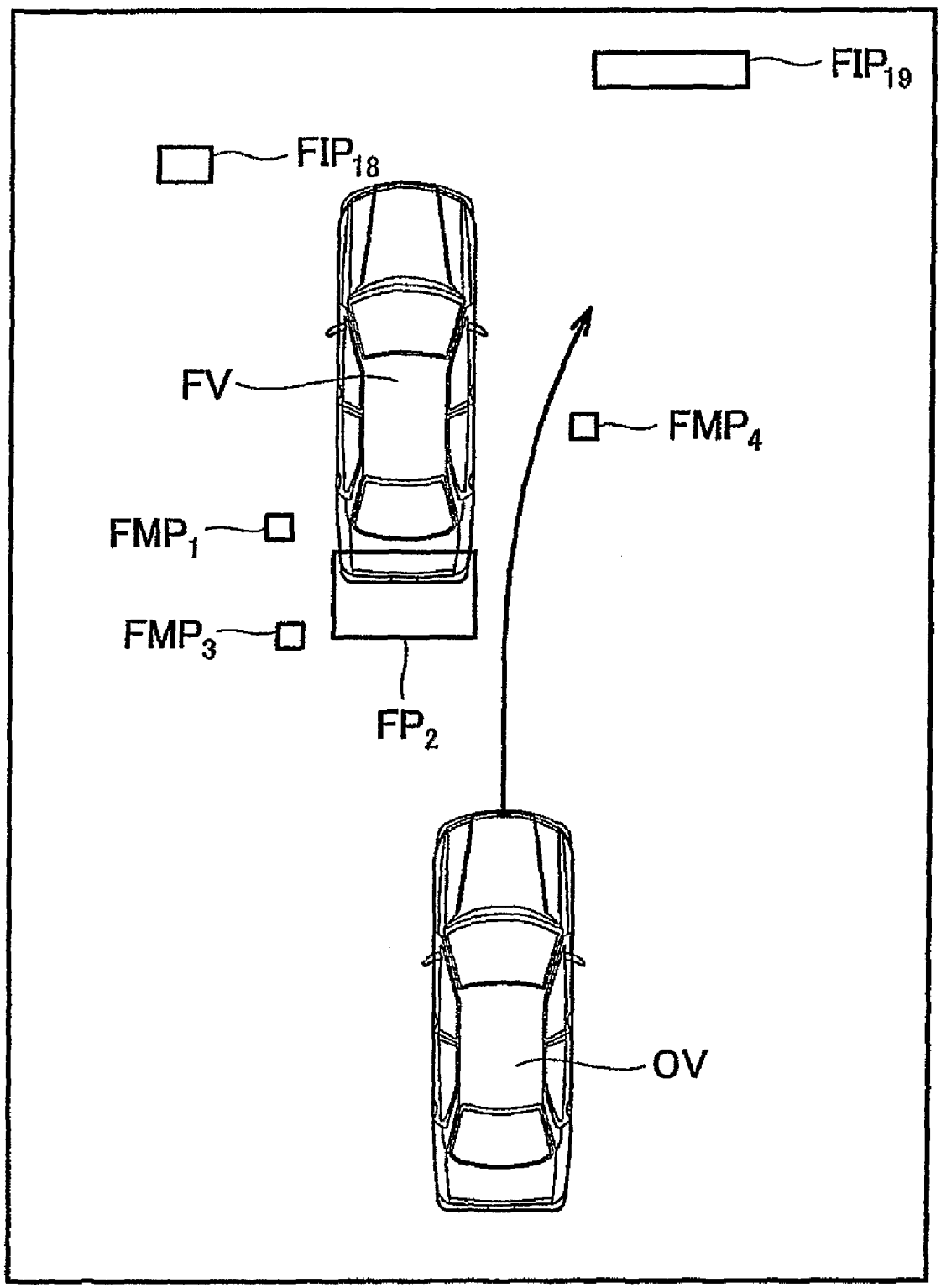
Figure 6:
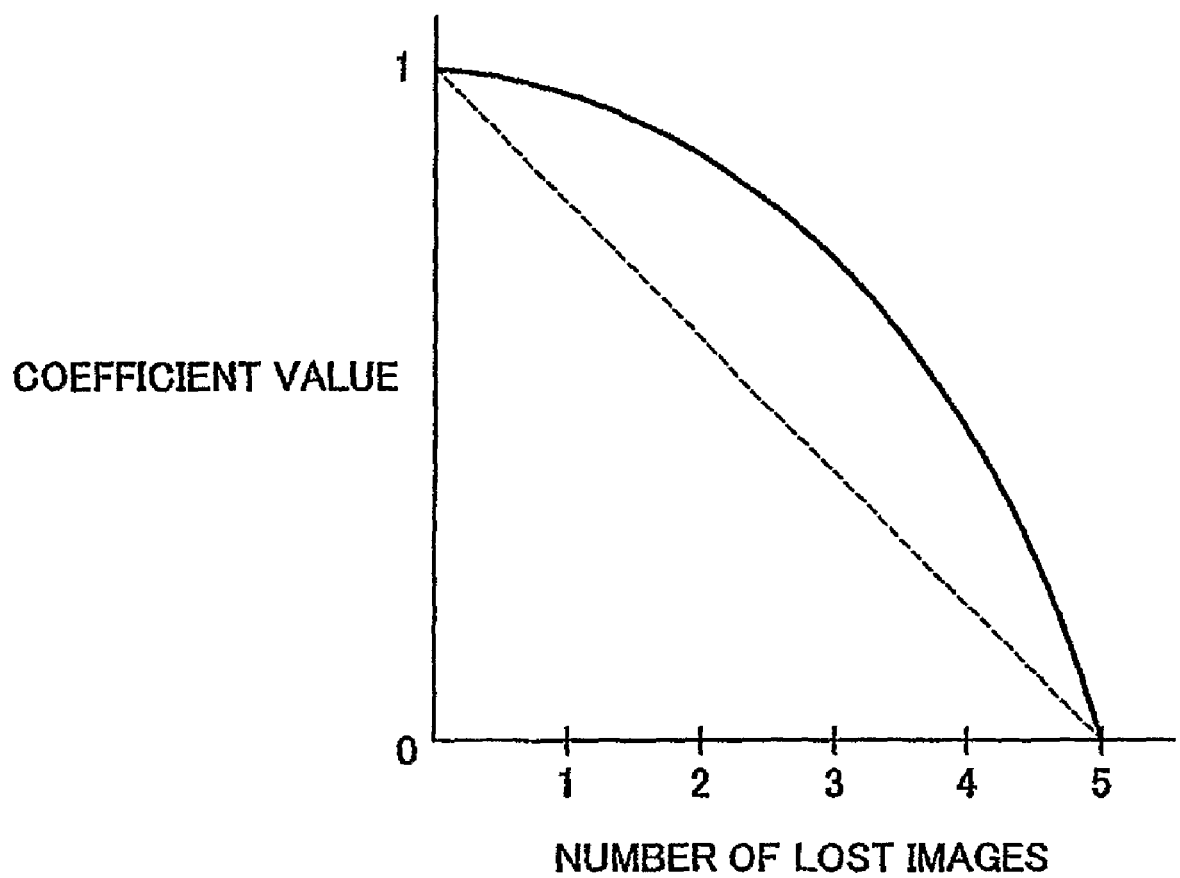
Figure 8:
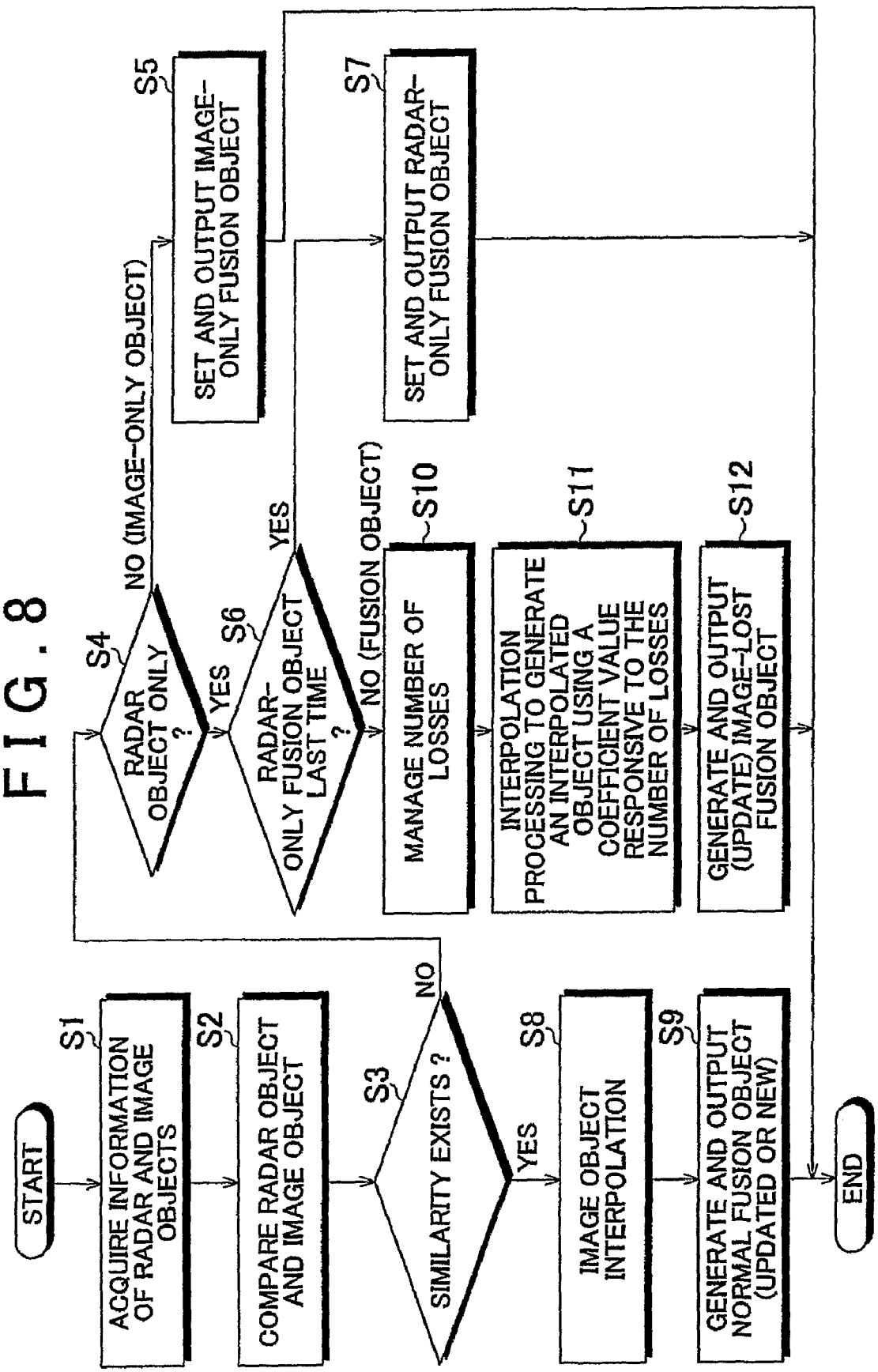

FIGS. 3A, 3B, and 3C are schematic views showing examples of interpolation processing and fusion object generation for the case in which a plurality of image objects exist within the search area;

FIG. 4 is a schematic view showing an example of actual search processing by the fusion logic section;

FIG. 5 is a schematic view showing the condition after search processing and fusion object generation by the fusion logic section;

FIG. 6 is a graph showing the characteristic relationship between the number of losses and the coefficient value;

FIGS. 7A, 7B, 7C, and 7D are schematic views showing the time sequence of examples of fusion object generation for cases of various numbers of lost images; and FIG. 8 is a simplified flowchart showing the flow of fusion object processing in an embodiment of the present invention.

DETAILED DESCRIPTION OF THE PREFERRED EMBODIMENTS

An example embodiment of an object detection apparatus according to the present invention is described below, with references made to the drawings. The embodiment is an example of application of an object detection apparatus of the present invention to a collision-reduction apparatus mounted on board a vehicle ("host vehicle"). The collision-reduction apparatus of this embodiment detects a vehicle in front of the host vehicle ("lead vehicle") as the detection target and performs various controls to prevent or reduce collisions with the leading vehicle. Specifically, the collision-reduction apparatus of this embodiment has two sensors, a millimeter wave radar and a stereo camera, that detect the lead vehicle by comparing the object detected by the millimeter wave radar and the object detected by the stereo camera.

Figure 1:
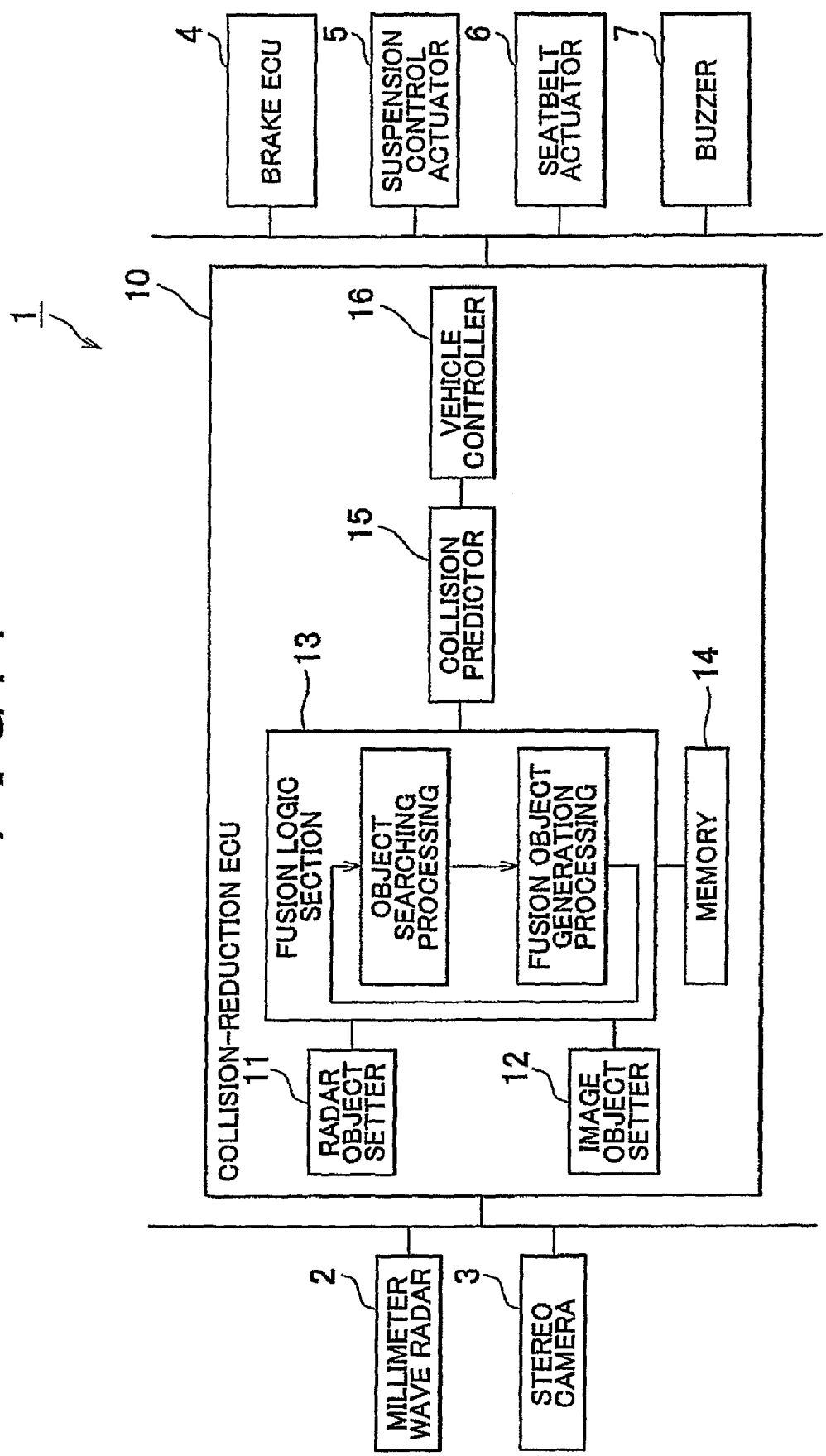
FIG. 1 shows the configuration of a collision-reduction apparatus according to an embodiment of the present invention.

The collision-reduction apparatus 1 according to the embodiment of the present invention will be described with reference to FIG. 1 to FIG. 8. FIG. 1 shows the configuration of the collision-reduction apparatus 1 according to this embodiment. The collision-reduction apparatus 1 detects a lead vehicle and, when a lead vehicle is detected, performs brake control, suspension control, seatbelt control, and warning signal control in accordance with the possibility of a collision. In order to detect the lead vehicle, the collision-reduction apparatus 1 sets a radar object based on detected information from the millimeter wave radar and sets an image object based on a stereo image from the stereo camera, and also sets a fusion object by comparing the radar object with the image object.

The foregoing collision-reduction apparatus 1 has a millimeter wave radar 2 corresponding toe an embodiment of a radar means, a stereo camera 3 corresponding toe an embodiment of the imaging means, a brake ECU (electronic control unit) 4, suspension control actuators 5, seatbelt actuators 6, a buzzer 7, and a collision-reduction ECU 10 and the like, these elements sending and receiving various signals via a CAN (Controller Area Network; a standard vehicle-borne LAN specification).

The various types of objects will first be described. A radar object is an object detected by the millimeter wave radar 2. The distance to an object and the horizontal position of an object that is detected by the radar are set as radar object information. An image object is an object detected by the stereo camera 3. The distance to an object and the horizontal position (including the width of the object as the object size) that are detected by the stereo camera 3 is set as image object information. The fusion object is an object for which it is determined that the radar object and the image object are the same object, this being an object created by fusing a radar object and an image object that satisfy a fusion condition of existing within the same search area. The distance to the radar object and the fused horizontal position that is fused information of the radar object with the image object (including the horizontal width as size information) are set in the fusion object. The horizontal position of the lead vehicle takes the center position of the host vehicle as a reference position, with the center position of the host vehicle being taken as zero, positions to the right thereof being positive values, and directions to the left thereof being negative values. The positions of each of the objects may be defined as positions relative to the vehicle position by distance (position information) and horizontal position (size information). The relative speed and the like may also be set as radar object information, and the depth, height, height position, and relative speed or the like may be set as image object information. In such cases, other information may be also set as fusion object information.

In this embodiment, in response to the fusion processing results, which are described later, a radar-only fusion object, an image-only fusion object, and an image-lost fusion object are used, in addition to the above-described normal fusion object. The radar-only fusion object is a radar-only object that could not be fused with the image object. The image-only fusion object is an image-only object that could not be fused with the radar object. An image-lost fusion object is an object generated when it is not possible to maintain fusion due to, for example, image loss when updating the image with respect to a generated fusion object. The image-lost fusion object is an example of a provisional fusion object.

The millimeter wave radar 2 detects an object by using millimeter waves. The millimeter wave radar 2 is mounted at the center of the front of the vehicle. The millimeter wave radar 2 scans millimeter waves within a horizontal plane, transmitting in the forward direction and receiving reflected millimeter waves. The millimeter wave radar 2 sends the transmitted and received data of the millimeter waves as radar signals to the collision-reduction ECU 10. The transmitted and received data includes such information as the transmitted millimeter wave information, information as to whether or not it was possible to receive the reflected waves corresponding to the transmitted millimeter waves, and any received information from the reflected waves.

The stereo camera 3 has two CCD cameras, which are separated by a prescribed distance in the horizontal direction. The stereo camera 3 is mounted at the center of the front of the vehicle. The stereo camera 3 images using the two CCD cameras and sends data of the left and right images to the collision-reduction ECU 10.

The brake ECU 4 adjusts the hydraulic pressure of the wheel cylinders of the four wheels to control the braking force at the four wheels. The brake ECU 4 sets the hydraulic control signals for each wheel based on the target braking force for each wheel, these hydraulic control signals being sent to brake control actuators that change the wheel cylinder hydraulic pressure at each wheel. Specifically, when the brake ECU 4 receives target braking force signals for each wheel from the collision-reduction ECU 10, the brake ECU 4 sets the hydraulic control signals for each wheel based on the target braking forces indicated by the target braking force signals. The brake control actuators change the hydraulic pressure of the wheel cylinders according to the target hydraulic pressure indicated by the pressure control signals when the hydraulic control signals are received.

The suspension control actuators 5 change the hydraulic pressure of the active suspensions at the four wheels. When the suspension control actuators 5 receive target damping force signals from the collision-reduction ECU 10, each suspension control actuator sets the target hydraulic pressure based on the target damping forces indicated by the target damping force signals to change the hydraulic pressure of the hydraulic active suspension based on the target hydraulic pressures. Although FIG. 1 shows only one suspension control actuator 5, one is provided at each wheel.

The seatbelt actuators 6 tighten each of the seatbelts to change the restraining force of the seatbelts. When the seatbelt actuators 6 receive target tightening-amount signals for each seatbelt from the collision-reduction ECU 10, they tighten the seatbelts in response to the target tightening-amount indicated by the target tightening-amount signals. Although FIG. 1 shows only one seatbelt actuator 6, a seatbelt actuator is provided for each seatbelt. The buzzer 7 outputs a buzzing sound when it receives an alarm signal from the collision-reduction ECU 10.

The collision-reduction ECU 10 is formed by such elements as a CPU, ROM, and RAM, and performs overall control of the collision-reduction apparatus 1. The collision-reduction ECU 10 has a radar object setter 11, an image object setter 12, a fusion logic section 13, a memory 14, a collision predictor 15, a vehicle controller 16, and the like. Each period of time based on a master clock of the CPU, the collision-reduction ECU 10 captures the radar signal from the millimeter wave radar 2 and the image signals from the stereo camera 3, and each prescribed period of time performs radar object setting processing by the radar object setter 11 based on radar information, performs image object setting processing by the image object setter 12 based on the stereo image, and performs fusion processing by the fusion logic section 13 based on the set radar object and image object. By doing this, a lead vehicle is detected, and control is performed with respect to the brake ECU 4, the suspension control actuators 5, the seatbelt actuators 6, and the buzzer 7, in response to the possibility of a collision with the lead vehicle.

The radar object setter 11 will now be described. The collision-reduction ECU 10 calculates the distance to a lead object based on the time from the radiation to the reception of the millimeter waves. In detecting an object by the millimeter wave radar 2, because an object is detected when reflected millimeter waves having intensity above a prescribed threshold value are received, the radar object setter 11 sets one radar object when reflected millimeter waves having a received intensity above the prescribed threshold value are received. Because it is possible in doing this to accurately detect the distance to the object in accordance with object detection by the millimeter wave radar 2, the accuracy of the distance of the set radar object is particularly high.

The image object setter 12 will now be described. The image object setter 12 uses the shift in viewing of the object between the left and right stereo images to identify an object in front of the vehicle by triangulation, and sets the image object when it is possible to identify the object. When setting the image object, the image object setter 12 calculates the distance from the stereo camera 3 to the object and the horizontal position of the object based on the stereo images. The distance and position constitute image object information. Specifically, the position information is information that includes the horizontal width of the object, and indicates the range in the horizontal direction over which the object was detected by the stereo camera 3. Because identification of the object is made by the stereo camera 3 when it is possible to identify an object from the left and right stereo images, the image object setter 12 sets one image object each time an object is identified.

Figure 2:
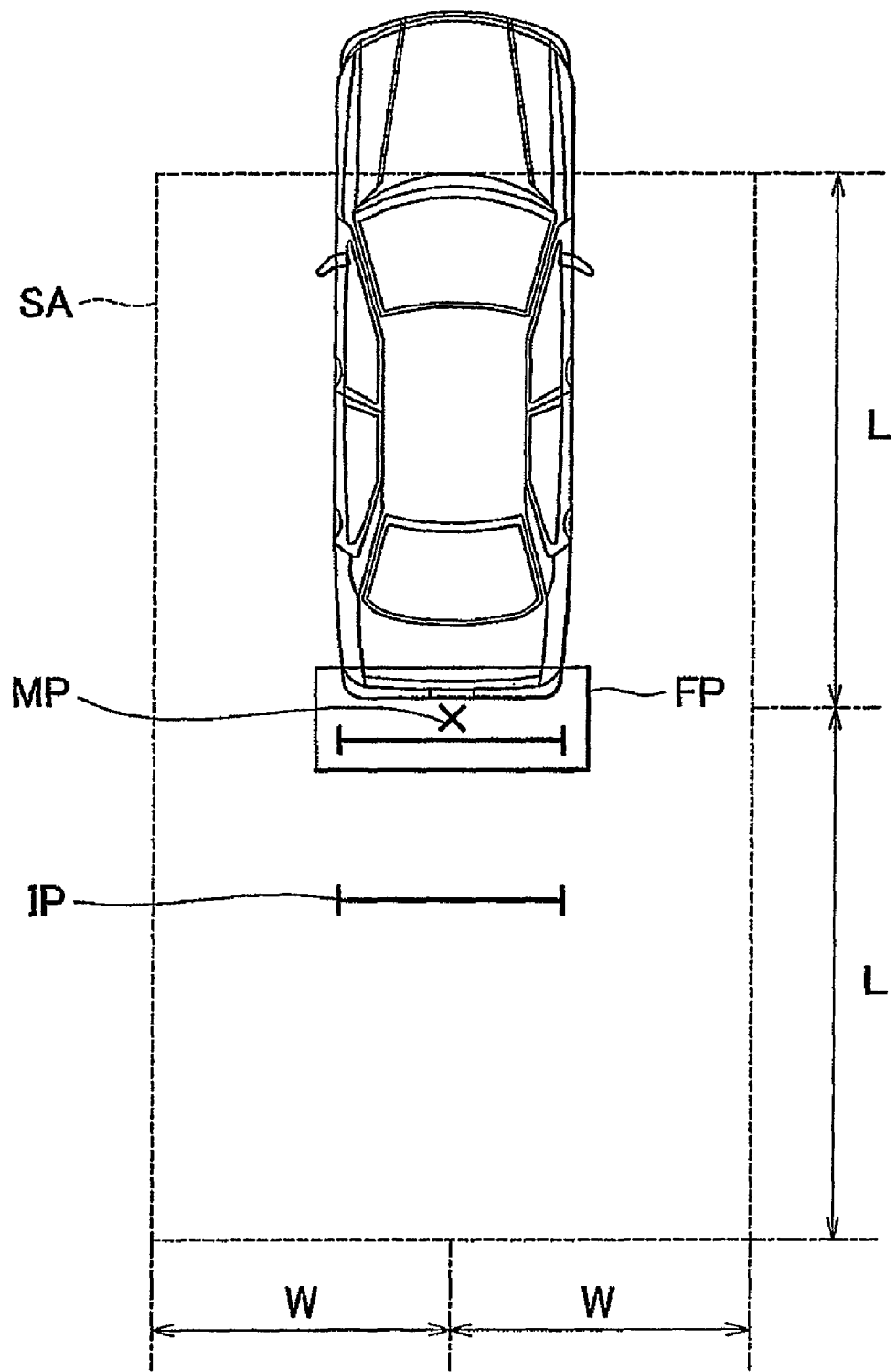
FIG. 2 is a schematic view showing an example of the search area set with respect to a radar object.

The fusion logic section 13 as a fusion processing means having an updating means will now be described. The fusion logic section 13 performs object searching processing and fusion object generation processing periodically each given period of time. First, when a radar object is detected by the radar object setter 11, the fusion logic section 13, as shown in FIG. 2, sets as a fusion condition a search area SA of ±L in the longitudinal direction and ±W in the transverse direction relative to the center position taken as the distance and horizontal position of the set radar object. FIG. 2 describes an example of the search area set with respect to the radar object. A search area such as SA is pre-established based on factors such as the average size of vehicles, and is held in the memory 14. Of the image objects detected by the image object setter 12, the fusion logic section 13 determines whether an object exists at the position of an image object (distance and horizontal position) within the search area SA. If there is an image object included within the search area SA, the fusion logic section 13 determines that there is similarity between the radar object and the image object, and determines that the radar object and the image object are the same object.

If the radar object and the image object are determined to be the same object, the fusion logic section 13 generates a fusion object by fusing the information of the radar object with the corresponding image object. The distance of the radar object is set, as is, as the distance used as fusion object information. The horizontal position of the radar object and one horizontal position or a horizontal position having a left and a right edge of a plurality of image objects is set as the horizontal position of the information of the fusion object. The horizontal position, therefore, is information that includes the horizontal width of the object, and is the widest horizontal direction range over which detection of an object was possible to the millimeter wave radar 2 and the stereo camera 3.

As shown in FIG. 2, the search area is set with the radar object MP at the center, and one image object IP exists within the search area SEARCH AREA. In FIG. 2, for example, the radar object is indicated by the X, the image object is indicated by the H, and the fusion object is indicated by the square. The H indicates the image object and the square indicates the fusion object indicate by the horizontal lengths thereof a horizontal width that is set in the image object and fusion object. In the example of FIG. 2, therefore, it is determined that the radar object MP and the image object IP are the same detected object satisfying the fusion condition, and the fusion object FP is set by causing the horizontal width of the image object IP to overlap with the center position of the radar object MP, as indicated by the arrow. In this case, because the fusion object is generated based on the radar object, the radar object number is used as is as a fusion object number historical control for the purpose of tracking the fused object.

In the case as well in which a plurality of image objects exists within the search area SA, the plurality of image objects are determined to be the same with the radar object. FIGS. 3A, 3B, and 3C are schematic views showing examples of interpolation processing and fusion object generation when a plurality of image objects exist within the search area. Because the stereo camera 3 detects a vertical edge image, there may be situations, for example as shown in FIG. 3A, where both edges of one object within the search area SA are detected so as to detect a plurality of included image objects IPa, IPb. In order to handle this situation, before generating the fusion object, interpolation processing is performed to obtain the maximum width with respect to the image objects IPa, IPb, as shown in FIG. 3B, thereby generating a single interpolated image object IPab, a fusion object FPab being generated using the interpolated image object IPab as shown in FIG. 3C.

FIG. 4 is a schematic view showing an example of actual search processing by the fusion logic section 13. FIG. 4 shows the case where a radar object $MP_2$ that is the target of processing is set on the rear part of a vehicle FV in front of the host vehicle OV, with an image object $IP_1$ existing within the search area SA2 using the radar object $MP_2$ as a reference, thereby satisfying the fusion condition and setting the fusion object $FP_2$. The subscript numbers indicate the object numbers of each object, and the fusion object number is controlled using the radar object number. The other radar objects $MP_1$, $MP_3$, $MP_4$, and image objects $IP_2$, $IP_3$, and the like indicate examples that do not satisfy the fusion condition when the radar object $MP_2$ is set as a reference.

FIG. 5 is a schematic view showing the condition after search processing and fusion object generation with respect to a situation such as shown in FIG. 4 by the fusion logic section 13. As noted above, in addition to setting the fusion object $FP_2$, the radar-only fusion objects $FMP_1$, $FMP_3$, $FMP_4$ are set, respectively, with regard to the radar objects $MP_1$, $MP_3$, $FMP_4$, and the image-only fusion objects $FIP_{18}$, $FIP_{19}$ are set, respectively, with regard to the image objects $IP_{18}$, $IP_{19}$ (the object numbers being assigned in accordance with a prescribed rule), all of these are output to the collision predictor 15 and appropriately used.

Once a fusion object that has been generated, when a subsequent fusion condition determination at the timing of image updating (the time of fusion search processing), the updating processing by the updating means having a fusion logic section 13 in the case where it is not possible to detect an object by the stereo camera 3 (undetected case) even though it is detected by the millimeter wave radar 2 will now be described. While such a situation can occur when the detection result of the millimeter wave radar 2 is in error and an actual object does not exist, it often happens, for example, that because of the influence by the condition of light reception (for example, at sunset or because of shadows), there is a momentary loss (non-detection) of the image-detected object at the stereo camera 3 side.

Given the above, in this embodiment, in such cases, by giving priority to the detection results from a millimeter wave radar 2, which has high detection accuracy, a prediction is made that a momentary error exists in the detection result from the stereo camera 3 and that an image object from the previous time exists, an image-lost fusion object (provisional fusion object) is generated by interpolation using prediction based on size information of the fusion object acquired previously, thereby causing continuation of the updating of corresponding fusion object of the last time within a prescribed period of time (within a prescribed number of times). When doing this, because an image-lost fusion object is generated where an image object having size information is not detected, so that the reliability of at least the size information decreases, the size information such as the horizontal width value set by interpolation of the generated image-lost fusion object using prediction is reduced from the size information of the corresponding fusion object from the previous time.

The number of times that an image-lost fusion object may be generated is limited, for example to five continuous lost-images, and if this number of continuous generations is exceeded, it is determined that the detection result from the stereo camera 3 is correct, and that an image object does not actually exist. Because the reliability of the size information of the image object decreases the longer the image loss continues (the longer the time of image loss), the size information set in the image-lost fusion object decreases with the elapse of time so as to depart from a value that is close to the size information of the original fusion object (the direction in which the size information decreases). Specifically, in this embodiment, a coefficient value for determining the size information set in the image-lost fusion object that is generated, as shown in FIG. 6, is decreased rapidly as the number of image-lost time, which indicates the elapse of time, increases, so that the size of the reduction is reduced non-linearly. FIG. 6 is a graph showing the characteristic relationship between the number of losses and the coefficient value, in which case the setting is made so as to non-linearly increase the size of the reduction. As shown by the broken line in FIG. 6, it is also possible to linearly decrease the coefficient value in response to the number of lost images.

An example of the generation of an image-lost fusion object accompanying image updating will now be described, with reference to FIG. 7A-D. FIG. 7 provides schematic views showing the time sequence of examples of fusion object generation for cases of various numbers of lost images. First, in FIG. 7A at the image update frame 0, which is the prerequisite used as a reference, the radar object MP and image object IP detection results exist within the search area, thereby satisfying the fusion condition, so that the interpolation processing required with regard to the image object IP is applied to generate the interpolated image object IP' and fuse it with the radar information MP, thereby generating the fusion object FP. The image updating frame 0 condition is usually repeated for each image updating until the object is no longer detected.

In FIG. 7B, the image updating frame 1, which is during the next updating determination, shows the case in which, although the radar object MP continues to exist as is, the image object IP is lost. At this point, if the radar object MP was not previously a radar-only fusion object, the fusion logic section 13, accessing a table stored in the memory 14, multiplies the size information acquired for the fusion object FP during the image updating frame 0 by a prescribed coefficient (for example, 0.95), to generate an interpolated image object $LIP_1$ (the subscript of which indicates the number of losses) predicted by the size information, the interpolated image object $LIP_1$ having that size information being fused with the radar object MP position, to generate an image-lost fusion object $LFP_1$ (the subscript fusion object of which indicates the number of losses), resulting in the fusion object FP of the image updating frame 0 being updated as the image-lost fusion object $LFP_1$ in the image updating frame 1.

FIG. 7C shows the case in which in the image updating frame 2 as well, which is during an updating determination after more time has elapsed, in which the radar object MP continues to exist as is, but the image object IP is lost, as shown by the broken lines. At this point, if the radar object MP was not the radar-only fusion object at the time of the previous updating, the fusion logic section 13, accessing a table stored in memory 14, multiplies the size information acquired for the fusion object FP during the image updating frame 0 by a prescribed coefficient (for example, 0.9), to generate an interpolated image object $LIP_2$ and fusing the interpolated image object $LIP_2$ having that size information with the radar object MP position, to generate an image-lost fusion object $LFP_2$, updating the fusion object FP in the image updating frame 0 to image-lost fusion object $LFP_2$ in image updating frame 2

FIG. 7D shows the case of further time having elapsed, for example the time of the image updating frame 4 when an updating determination is made, at which although the radar object MP continues to exist as is, the image object IP remains lost, as indicated by the broken lines. At this point, if the radar object MP was not previously a radar-only fusion object, the fusion logic section 13, accessing a table stored in the memory 14, multiplies the size information acquired for the fusion object FP during the image updating frame 0 by a prescribed coefficient (for example, 0.4), to generate an interpolated image object $LIP_4$, the interpolated image object $LIP_4$ having that size information being fused with the radar object MP position, so as to generate an image-lost fusion object $LIP_4$, updating the fusion object FP in the image updating frame 0 to the image-lost fusion object $LFP_4$ in the image updating frame 4.

By performing processing to generate image-lost fusion objects in this manner, when the first or second time of image loss, if there is a momentary loss of image by the stereo camera 3 in accordance with the prediction, it is possible if return is made subsequently to a normal detection result from the stereo camera 3, to immediately return to the original fusion object GP condition and perform updating. For example, in the case at the image updating frame 2 in which the image object IP was properly obtained, it is possible to return immediately from the image-lost fusion object $LFP_1$ shown in FIG. 7B to the fusion object FP shown in FIG. 7A. In the same manner, in the case in at the image updating frame 3 in which the image object IP was properly obtained, it is possible to return immediately via the image-lost fusion objects $LFP_2$ and $LFP_1$ shown in FIG. 7C and FIG. 7B to the fusion object FP shown in FIG. 7A. In particular, if the number of lost images is one or two, because, assuming that the reliability of the image object information at the starting image object IP being somewhat high, the amount of reduction of the size information is suppressed to a low level, it is possible to perform transitions between the image-lost fusion objects $LFP_1$ and $LFP_2$ with no feeling of unnaturalness.

In contrast, if the lost images continue for four to five times, contrary to the prediction, the detection result from the stereo camera 3 (image not detected) is correct, and there is a large possibility that the detection by the millimeter wave radar 2 is in error. In this case, because, assuming that the reliability of the image object information according to the original image object IP is extremely low, the amount of reduction in the size information is non-linearly increased, the image-lost fusion object $LFP_4$ has almost no horizontal width value. Thus, it is possible to reduce the influence of erroneous information on the post-stage logic.

The collision predictor 15 will now be described. When the fusion logic section 13 sets a fusion object (including an image-lost fusion object), this being the case in which there is a lead vehicle, the collision predictor 15, considering the vehicle speed, sets the level of the possibility of a collision in steps (high, low, or no possibility), based on the distance to the lead vehicle that is set in the fusion object.

When the possibility of a collision is set in steps by the collision predictor 15, a vehicle controller 16, in response to the level of possibility of a collision, may control, for example, the suspension actuators 5, the seatbelt actuators 6, and the buzzer 7.

Operation of the collision-reduction apparatus 1 will now be described. The flow of object searching processing and fusion object generation processing in the fusion logic section 13 will be described with reference to the flowchart shown in FIG. 8, which is a simplified flowchart showing the flow of processing in this embodiment.

The millimeter wave radar 2 transmits millimeter waves in the forward direction as it scans, receives the reflected waves, and sends the transmitted and received data to the collision-reduction ECU 10 as radar signals. The stereo camera 3 captures images forward, the left and right images therefrom being sent to the collision-reduction ECU 10 as image signals.

The collision-reduction ECU 10, in addition to receiving the radar signals from the millimeter wave radar 2, receives image signals from the stereo camera 3. The radar object setter 11 sets a radar object based on the radar information according to the radar signals each given period of time. The image object setter 12 sets an image object based on the left and right stereo images each given period of time.

The fusion logic section 13 performs object searching processing and fusion object generation processing as described below during each given period of time. First, each given period of time, the information of the radar object and the image object is obtained (step S1). At this point, the radar object to be the target of processing is identified, the search area is set based on the radar object, and the other radar objects and image objects existing in the area surrounding the radar object are taken as targets.

Next, by comparing an acquired radar object or image object based on the radar object taken as a target (step S2), processing is performed to determine similarity as to whether the radar object and the image object both exist within the search area, thereby satisfying the fusion condition (step S3).

At this determination processing, if there is no similarity (NO at step S3) and also it is not a radar-only object (NO at step S4), output is made from the fusion logic section 13 as the image-only fusion object (step S5). If in the same manner there is no similarity (NO at step S3) and also it is the case of a radar-only fusion object (YES at step S4), in the case in which at the previous time of updating determination (updating frame) the radar object was a radar-only fusion object (YES at step S6), updating is done again as a radar-only fusion object and output is made from the fusion logic section 13 (step S7). Because the fusion object number is the same number as the radar object number, and the history thereof is managed by the same number as the radar objects, it is possible to distinguish whether the radar fusion object at the previous time of updating was a radar-only fusion object or a fusion object.

If the fusion condition is satisfied and it is determined that there is similarity (YES at step S3), after performing the required interpolation processing with regard to the image object (step S8), the information of the radar object is fused with the information of the image object to generate a fusion object, which is output from the fusion logic section 13 (step S9). In this case, the required interpolation processing at step S8 is, for example, fusion processing of a plurality of image objects that satisfy the fusion condition, as described in FIG. 3, or interpolation processing that accompanies a difference in updating periods between a radar object and an image object. In the processing of step S9, by referring to the object number, it is possible to distinguish whether the fusion object is a new fusion object or a continued fusion object that is to be updated.

On the other hand, if the radar object satisfies the fusion condition but the image object does not satisfy the fusion condition (NO at step S3 and YES at step S4), if the radar object at the previous updating determination (updating frame) was not a radar-only fusion object (NO at step S6), the prediction is made that at the previous updating determination the object was a fusion object and that the image was lost this time, at which point the number of image losses in counted (step S10) and, after performing the required interpolation processing for generating an interposed image object by interpolating the size information, using a coefficient for interpolation responsive to the number of lost images (step S11), information of the radar object and information of the interposed image object are fused to generate an image-lost fusion object, which is output from the fusion logic section 13. The image-lost fusion object updates the fusion object of the updating determination the previous time. The processing shown in FIG. 8 is performed in the same manner for all combinations of radar objects and image objects.

By the foregoing fusion processing, if the current fusion object is set, the collision predictor 15, based on the information set to that fusion object, sets the level of possibility of a collision in steps, and the vehicle controller 16, in response to the level of possibility of a collision, controls the suspension actuators 5, the seatbelt actuators 6, and the buzzer 7. By this control, at a low level of possibility of a collision with a lead vehicle, the driver is notified of the approach of the lead vehicle by the tightening of the seatbelt by the seatbelt actuator 6 and the output of a buzzer sound from the buzzer 7. Additionally, if the level of possibility of a collision with a vehicle in the frontal direction increases, deceleration is done by automatic braking force in accordance with the brake ECU 4, the hardness of the suspension is adjusted by the suspension control actuators 6, passengers are tightly restrained by further tightening of the seatbelts by the seatbelt actuators 6, and the driver is notified of the continued approach of the lead vehicle by the output of a buzzer sound from the buzzer 7.

The present invention is not restricted to the foregoing embodiment, and can take on a various forms within the scope of the spirit of the present invention.

For example, although in this embodiment the description was that of application of to a collision-reduction apparatus mounted aboard a vehicle, the invention may be incorporated in other driving support or peripheral monitoring apparatuses as well, such as application to an adaptive cruise control apparatus or a car-following apparatus, in addition to stand-along application as an object detection apparatus. Also, the detection target, in addition to a lead vehicle, may be another object, such as a pedestrian or a bicycle. Further, the present invention may be mounted, in addition to mounting aboard a vehicle, on a robot or the like.

Although a millimeter wave radar 2 is used as a radar means in the foregoing embodiment, any type of radar may be used. In the same manner, although a stereo camera 3 is used as the imaging means, a single-lens camera may also be used.

Although the foregoing embodiment is described as an example in which the detection results of the stereo camera 3 do not satisfy the fusion condition with respect to the millimeter wave radar 2 at the time of an updating determination of the fusion condition (time of image updating), there is no restriction to image loss (non-detection of an image), and it is possible, for example, to make application to the case in which there is momentary overlapping of a lead vehicle with a white line on the road, or in which there is momentary overlapping between several lead vehicles, so that the width of the imaging-detected object is erroneously detected as showing an extreme widening. In these cases, in the detection result from the stereo camera 3, the size information of the image object is excessively large, so that the fusion condition is not satisfied, in which case the object can be changed to depart from a value that is close to the size information of the fusion object with the elapse of time. In particular it is desirable that the amount of change in the size information to be changed be non-linearly increased with the elapse of time. For example, if a size that is twice the original fusion object size, the size information of the provisional fusion object can be varied to be 1.05 times, 1.1 times, 1.3 times, 1.6 times, and 2.0 times the original fusion object size information.

Although in this embodiment the example was one in which a determination of whether a fusion condition is satisfied is made by comparing a radar object and an image object, the present invention is not restricted to this. For example, if windshield wipers or light sources are imaged and it is judged that it is not possible to detect an object from the image information, it may be determined from the image information only that the fusion condition is not satisfied.

The invention claimed is:

1. An object detection apparatus comprising
a radar that detects position information of an object detected by the radar;
an imaging device that detects position information and size information of an object detected by the imaging device; and
a fusion processing device that fuses the object detected by the radar and the object detected by the imaging device when the detection results of the radar and the imaging device satisfy a prescribed fusion condition to generate a fusion object having position information and size information and that provisionally fuses the object detected by the radar and the object detected by the imaging device when the detection results of the radar and the imaging device do not satisfy the prescribed fusion condition to generate a provisional fusion object having position information and size information,
wherein the fusion processing device includes an updating device that updates size information of a previously acquired fusion object or size information of a previously acquired provisional fusion object to an updated size information, which is a value smaller than a value of the size information of the previously acquired fusion object or the size information of the previously acquired provisional fusion object, the updated size information being predicted based on the size information of the previously acquired fusion or the size information of the previously acquired provisional fusion object when the detection result from the imaging device does not satisfy the prescribed fusion condition with respect to the detection result from the radar.

2. The apparatus according to claim 1, wherein
the updating device updates the updated size information so as to depart from a value that is close to the size information of the previously acquired fusion object or the size information of the previously acquired provisional fusion object with the passage of time in the case in which the detection result from the imaging device does not satisfy the prescribed fusion condition with respect to the detection result from the radar.

3. The apparatus according to claim 2, wherein
the updating device non-linearly increases the amount of change of the updated size information.

4. The apparatus according to claim 1, wherein the updating device updates the size information of the previously acquired fusion object or of the previously acquired provisional fusion object by using a prescribed coefficient.

5. The apparatus according to claim 1, wherein
the fusion processing device sets an object search area based on the position information of the object detected by the radar and, when the image object position set based on the position and size information of an object detected by the imaging device is determined to be included within the search area, determines that the prescribed fusion condition is satisfied.

6. The apparatus according to claim 1, further comprising:
a collision predictor that predicts the possibility of a collision with another vehicle in the forward direction, based on position information of a fusion object or a provisional fusion object generated by the fusion processing device.

7. A method for detecting an object comprising the steps of receiving position information of an object by a radar,
receiving position information and size information of an object by an imaging device,
fusing the object detected by the radar and the object detected by the imaging device when the detection result of the radar and the imaging device satisfy a prescribed fusion condition to generate a fusion object having position information and size information and provisionally fusing the object detected by the radar and the object detected by the imaging device when the detection result of the radar and the imaging device do not satisfy a prescribed fusion condition to generate a provisional fusion object having position information and size information, and
updating the size information of a previously acquired fusion object or the size information of a previously acquired provisional fusion object to an updated size information, which is a value smaller than a value of the size information of the previously acquired fusion object or the size information of the previously acquired provisional fusion object, the updated size information predicted based on the size information of the previously acquired fusion object or the size information of the previously acquired provisional fusion object, when the detection result from the imaging device does not satisfy the prescribed fusion condition with respect to the detection result from the radar.

8. The method according to claim 7, wherein
in the step of generating the provisional fusion object, the updated size information is set so as to depart from a value that is close to the size information of the previously acquired fusion object or the size information of the previously acquired provisional fusion object, with the passage of time in the case in which the detection result from the imaging device does not satisfy the prescribed fusion condition with respect to the detection result from the radar.

* * * * *